United States Patent [19]
Tholander et al.

[11] 3,811,611
[45] May 21, 1974

[54] WELDING GUNS

[75] Inventors: Lars Helge Gottfried Tholander, Huskvarna; Harry Thostrup, Laxa, both of Sweden

[73] Assignee: Elektriske Svetsnigsaktiebolaget, Enkoping, Sweden

[22] Filed: Sept. 10, 1971

[21] Appl. No.: 179,498

[30] Foreign Application Priority Data
Sept. 14, 1970 Sweden .................... 12433/70

[52] U.S. Cl. .............................. 226/178, 226/188
[51] Int. Cl. ........................................... B65h 17/22
[58] Field of Search .......... 226/168, 178, 181, 186, 226/187, 188; 219/136, 137; 415/503, 148, 502

[56] References Cited
UNITED STATES PATENTS
2,629,365   2/1953   Kennedy .................... 219/136 X
2,382,526   8/1945   White ........................ 415/148 X
2,893,688   7/1959   Saada ........................ 415/148

*Primary Examiner*—Lloyd L. King
*Assistant Examiner*—Gene A. Church

[57] ABSTRACT

A welding gun for consumable electrode welding provided with a compressed-air electrode advancing motor and a throttle valve provided between the outlet of said motor and the atmosphere for adjusting the speed of the motor.

1 Claim, 7 Drawing Figures

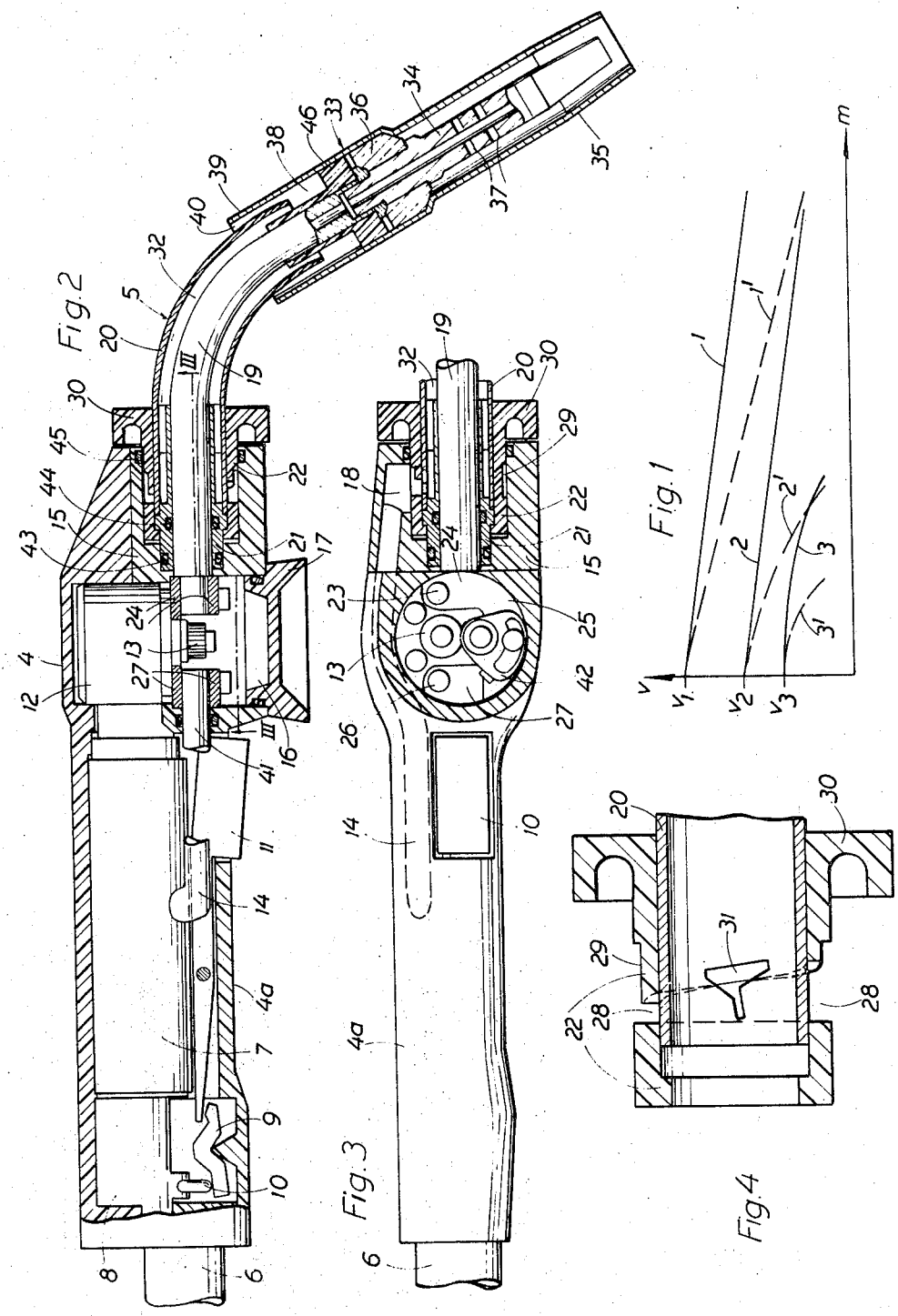

WELDING GUNS

This invention relates to welding guns for consumable-electrode arc welding of the kind provided with a wire advancing mechanism and a compressed-air motor for driving said mechanism.

In the welding guns of this kind hitherto available, the required adjustment of the rate of rotation of the motor and the rate of advancement of the welding wire is effected by adjustment of a throttle valve provided between the source of compressed air and the air inlet of the motor. This arrangement results in a drooping speed-load characteristic of the motor, particularly at low rates of advancement (small throttle areas). A drooping speed-load characteristic means that the rate of rotation of the motor decreases steeply on increase of the load torque. On the other hand, it is well known that it is important to maintain a substantially constant rate of advancement during a welding operation, and that, accordingly, the variations of the rate of rotation of the motor resulting from the unavoidable variations of the friction resistance opposing the advancement of the wire have to be kept within narrow limits, preferably not exceeding 5 percent. One way of meeting this requirement is to use a motor the nominal load rating of which substantially exceeds the maximum load likely to occur in practice. The motor then will operate along a small portion only of its load characteristic in the vicinity of the no-load point. It is clear, however, that this expedient is not consistent with the practical requirement of keeping down the weight and the size of the motor as much as possible.

It is a principal object of the invention to provide a welding gun of the kind specified with improved motor speed control means which do not tend to render the speed-load characteristic of the motor undesirably drooping.

The invention in its most general aspect comprises the combination, in a welding gun for consumable-electrode arc welding, of a wire advancing mechanism, a compressed air motor for driving said mechanism, said motor having an air inlet and an air outlet, conduit means for connecting said air inlet to a source of compressed air, conduit means for connecting said air outlet to the atmosphere, and a throttle valve provided in said last-mentioned conduit means for controlling the flow of air therethrough. The provision of the throttle valve in the outlet conduit means constitutes a characterizing feature of the invention and results in a load characteristic which, for a given motor and a given rate of rotation, is stiffer (that is, less drooping) than the one resulting from the use of a throttle valve in the inlet conduit of the motor.

Other objects, features and advantages of the invention will be apparent from the following description, the accompanying drawing and the appended claims.

In the drawing,

FIG. 1 is a diagram illustrating the advantage of the invention,

FIG. 2 is a sectional view of a welding gun exemplifying the invention,

Figure 5:
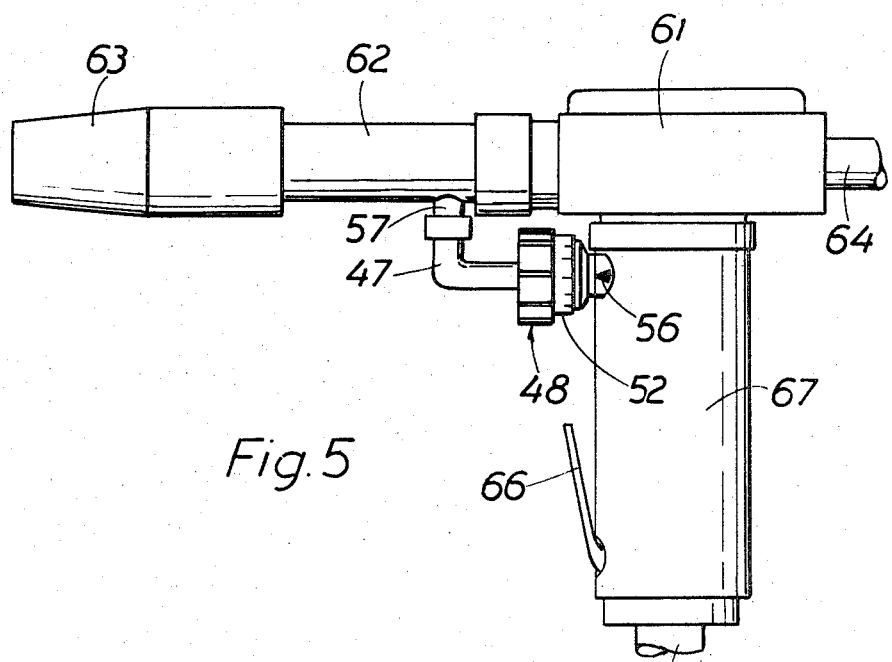
Figure 6:
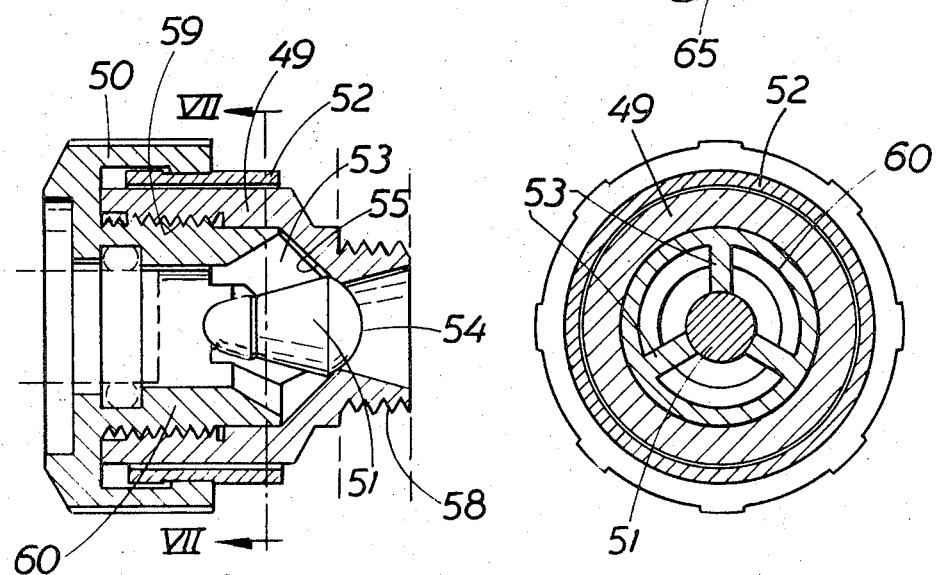
Figure 7:
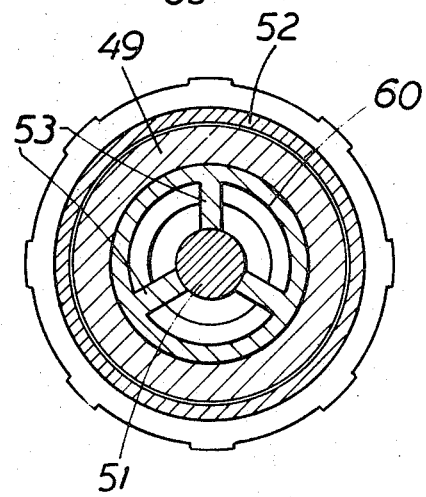

FIG. 3 is a partial view of the welding gun of FIG. 2 seen from below, some parts being represented in section along the line III—III of FIG. 2, FIG. 4 is magnified sectional view of a throttle valve forming part of the welding gun of FIGS. 2–3, FIG. 5 is a side view of a second welding gun exemplifying the invention, FIG. 6 is a magnified sectional view of a throttle valve forming part of the gun of FIG. 5, and, FIG. 7 is a sectional view taken along the line VII—VII of FIG. 6.

FIG. 1 schematically represents a group of characteristics for a compressed-air motor operated under different conditions. Each of the characteristics represents the rate of rotation $v$ of the motor as a function of the load torque $m$. In the case represented by the characteristic 1, a throttle provided in the outlet conduit of the motor has been adjusted to provide the no-load speed $v_1$. The line 1' is the speed-torque characteristic of the same motor in the case that the inlet conduit of the motor is provided with a throttle adjusted to provide the same no-load speed $v_1$. The pressure of the source of compressed air is the same in both cases. It will be noted that the decrease of the rate of rotation caused by a given increase of the load torque is considerably less in the first case (throttle in outlet conduit) than in the second case (throttle in inlet conduit). The difference is still more marked when the throttle area is decreased to provide a lower no-load speed, as illustrated by the characteristics 2, 2' and 3, 3', corresponding to the lower no-load speeds $v_2$ and $v_3$, respectively.

The welding gun illustrated in FIGS. 2 and 3 consists of a gun body or housing 4, a neck 5 and a head 33. The rear portion of the housing 4 is shaped into a tubular handle 4a enclosing a compressed-air motor 7. The motor 7 drives a wire advancing roll 13 through suitable speed reducing gear fitted within the motor housing and a bevel gear fitted within a gear box 12 rigidly attached to the motor housing. The welding wire, the shielding gas, the welding current and the compressed air required for the operation of the gun are supplied to the gun through a common flexible composite tube or hose 6 attached to the rear end of the handle 4a. Said flexible tube 6 comprises an inner gas-tight flexible tube to conduct the shielding gas and the welding wire, an outer gas-tight flexible tube surrounding and spaced from said inner tube to conduct the compressed air, and a plaited hose-shaped wire cable for the welding current surrounding said inner tube and surrounded by said outer tube, as described in the U.S. Pat. specification No. 3,324,225. The compressed-air motor is connected to the compressed-air conduit of the flexible tube 6 through means including a valve housing 8 enclosing a compressed-air valve operated by the trigger 11 of the gun through a mechanism comprising a lever 9 and a plunger 10. Operation of the trigger 11 shifts the compressed-air valve from its normally closed position to its open position. A fitting 15 attached to the forward end of the body 4 encloses a circular chamber 16 covered by a gas-tight lid 17. A generally annular member 25 of electrically conducting material fitted into the chamber 16 supports an adjustable member 42 pivotably supporting an idle roll (not visible) cooperating with the advancing roll 13. A copper tube 41 extending within the handle 4a is connected at its rear extremity to the inner tube of the composite tube 6 as well as to the welding cable forming part of said composite tube, while its front extremity opening into the chamber 16 is held by a clamp 27 having a tightening screw 26, said clamp forming part of the annular member 25.

Th neck 5 consists of an inner tube 19 and an outer tube 20 supported in concentrical relation to the inner tube by a sleeve 21 fitted on the inner tube. The neck thus formed is fitted in a socket formed by a bore in the fitting 15. The rear extremity of the inner tube 19, which extends into the chamber 16, is held by a clamp 24 having a tightening screw 23, said clamp forming part of the annular member 25. The tube 19 receives the welding wire emerging from between the advancing roll 13 and the idle roll cooperating the same, as well as the shielding gas discharged into the annular chamber by the copper tube 41. A sleeve 22 engaging the outer tube 20 is angularly adjustable with regard to said tube, a flange 30 integral with said sleeve serving to facilitate the manual adjustment. The sleeve 22 is provided with a circumferential groove 29 and with a wedge-shaped aperture 28 extending around about three-fourths of the circumference of the grooved portion of the sleeve and cooperating with an aperture 31 provided in the outer tube 20. The forward edge of the aperture 28 forms a spiral line, so that the part of the aperture 31 laid bare by the aperture 28 will vary with the angular position of the sleeve 22. A chamber 18 provided in the fitting 15 adjacent to the circumferential groove is connected to the air outlet of the motor 7 through a conduit 14. Thus, the spent air discharged by the motor 7 will enter the annular passage 32 between the tubes 20 and 19 through the throttle valve formed by the apertured portions of the sleeve 22 and the tube 20.

Seal rings 43, 44 prevent access of air to the chamber 16, while seal ring 45 prevents leakage of compressed air from the chamber 18 or the groove 29 to the atmosphere.

The head 33 of the welding gun comprises a guide and contact tube 34 attached to the end of the inner tube 19 of the neck, and a gas nozzle 35 fitted on the contact tube through an electrically insulating collar 36. Said collar consists of an annular body or of a plurality of sections of heat-resistant electrically insulating material, preferably a material having a comparatively high heat conductivity, for instance beryllium oxide or boron nitride. Lateral apertures 37 of the contact tube are provided to permit the shielding gas to enter the shielding gas nozzle 35. A sealing element 46 protects the shielding gas nozzle from air leaking in from behind. A rear extension of the nozzle 35 forms a skirt 39 extending backwards beyond the tip of the outer neck tube 20, so that the exhaust air entering the chamber 38 between said skirt and the inner neck tube 19 will be ejected backwards through the passage 40 between the skirt 39 and the tube 20.

The cooling action exerted upon the inner neck tube and the skirt 39 by the current of air through the exhaust conduit constituted by the passages 32 and 40 considerably exceeds the one which would result if no throttling means were provided between the motor outlet and said conduit. This is explained by the fact that the air consumption (weight of air per unit of time) required to operate the motor at a given speed is larger, with a corresponding increase of the current of air through the exhaust conduit.

The welding gun of FIG. 5 consists of a tubular handle 67, a body 61, a neck 62 and a head 63. The body contains a wire advancement mechanism operated through suitable speed reducing gear by an air motor fitted in the handle. Compressed air is supplied to the motor through a hose 65 connected with the motor inlet through an on-off valve operated by a trigger 66. A composite hose 64 of the type disclosed in the U.S. Pat. specification No. 3,433,882 supplies the gun with welding wire, welding current and shielding gas. The neck 62 consists of an inner tube corresponding to the tube 19 of FIG. 2 and an outer tube corresponding to the tube 20 of FIG. 2. The construction of the head 63 substantially corresponds to the one of the head 33 of FIG. 2. The outlet conduit of the motor is connected to the outer tube of the neck 62 through a throttle valve 48 and a tube 47 connected to a pipe socket 57 welded on the outer tube of the neck 62.

The throttle valve comprises a socket 49 provided at one extremity with an external thread 58 corresponding to a threaded bore of the handle 67, and at the other extremity with an internal thread 59 engaging a bush 60 in which a valve plug 51 is supported by means of three vanes 53. A cylindrical knob 50 integral with the bush 60 carries an annular scale 52 cooperating with an index 56 on the handle 67. The scale 52 is frictionally fitted into the knob 50, so that it can be angularly adjusted to the proper position when the socket 49 has been joined to the handle 67. Rotation of the bush 60 by means of the knob 50 causes the spherical front face 54 of the valve plug 51 to approach or to recede from the conical valve seat 55 of the valve socket 49, resulting in a change of the effective cross-sectional area of the throttle valve.

We claim:

1. In an arc welding gun for consumable-electrode arc welding, a wire advancing mechanism, a compressed-air motor for driving said mechanism, said motor having an air inlet and an air outlet, conduit means for connecting said air inlet to a source of compressed air, said conduit means including a valve, a trigger for controlling said valve, an exhaust conduit, a throttle valve connected between said air outlet and said exhaust conduit, and manually operable means for adjusting said throttle valve for presetting the speed of the motor.

* * * * *

CERTIFICATE OF CORRECTION

Patent No. 3,811,611　　　　　Dated May 21, 1974

Inventor(s) LARS HELGE GOTTFRIED THOLANDER and HARRY THOSTRUP

It is certified that error appears in the above-identified patent and that said Letters Patent are hereby corrected as shown below:

Assignees [73]

Elektriska Svetsningsaktiebolaget, Gothenburg, Sweden
and Aktiebolaget Bahco Verktyg, Enkoping, Sweden Signed and sealed this 8th day of October 1974.

(SEAL)
Attest:

McCOY M. GIBSON JR.
Attesting Officer

C. MARSHALL DANN
Commissioner of Patents